United States Patent [19]

Nishimura et al.

[11] Patent Number: 4,656,660

[45] Date of Patent: Apr. 7, 1987

[54] OFFICE LINE HOLDING CIRCUIT WITH AN AUTOMATIC RELEASE FUNCTION FOR DIRECT CONNECTION TELEPHONE SYSTEM

[75] Inventors: Toshio Nishimura; Shinichi Tokita, both of Kawasaki, Japan

[73] Assignee: Nitsuko Limited, Kawasaki, Japan

[21] Appl. No.: 732,384

[22] Filed: May 9, 1985

[30] Foreign Application Priority Data

| May 10, 1984 | [JP] | Japan | 59-91787 |
| May 10, 1984 | [JP] | Japan | 59-91788 |
| Jul. 25, 1984 | [JP] | Japan | 59-113009[U] |

[51] Int. Cl.[4] .......................................... H04M 1/00
[52] U.S. Cl. ..................................... 379/393; 379/162
[58] Field of Search ................ 179/81 R, 84 R, 99 H, 179/81 C

[56] References Cited

U.S. PATENT DOCUMENTS 4,454,385 6/1984 Grantland et al. ............... 179/81 R
4,517,414 5/1985 Boeckmann ....................... 179/81 R

*Primary Examiner*—James L. Dwyer
*Attorney, Agent, or Firm*—Roberts, Spiecens & Cohen

[57] ABSTRACT

An office line can be held by a holding path including a thyristor in response to operation of a manual operating hold switch during a call by a telephone set in a direct connection telephone system. A voltage drop on the office line due to an off-condition of any one of the telephone sets in the system caused thereafter can be detected by a capacitor and the thyristor is thereby turned off to release the office line holding condition. The office line holding condition is indicated by a light emission diode, and a hold sound signal is sent out to the office line during the office line holding condition.

11 Claims, 4 Drawing Figures

OFFICE LINE HOLDING CIRCUIT WITH AN AUTOMATIC RELEASE FUNCTION FOR DIRECT CONNECTION TELEPHONE SYSTEM

BACKGROUND OF THE INVENTION

1. Field of the Invention

This invention relates to a direct connection telephone system, and in particular, to an office line holding circuit with an automatic release function.

2. Description of the Prior Art

The direct connection telephone system has a plurality of telephone sets which are directly connected to a pair of subscriber's drop terminals of a common office line of paired two wires.

In actual use of the direct connection telephone system, a plurality of telephone sets of the system are generally disposed at different places remote from one another, for example, one being on the first floor with the other on the second floor in a house. During a call from the telephone set on the first floor, it often happens that the call is desired to be continued by another telephone on the second floor. This is realized by leaving the first floor telephone set in the off-hook condition and taking the handset of the second floor telephone set off the hook. However, it is required to reset the first floor telephone set in the on-hook condition after taking off the handset of the second floor telephone set, or after the end of the telephone call on the second floor. Otherwise, any telephone call by the other subscribers cannot be, thereafter, received.

This is a disadvantage of the direct connection telephone system.

SUMMARY OF THE INVENTION

An object of the present invention is to provide an office line holding circuit with an automatic release function for a direct connection telephone system, which is economical, simple in circuit, and easy in use.

The present invention provides a novel office line holding circuit with an automatic release function for a direct connection telephone system which has a plurality of telephone sets directly connected to a pair of subscriber's drop terminals of a common office line of paired two wires, which can hold the office line even after any one of the telephone sets is put in an on-hook condition during a call by the telephone set and which can automatically release the office line from the holding condition in response to an off-hook operation at any one of said telephone sets.

According to the present invention, an office line holding circuit with an automatic release function can be obtained which comprises polarity identifying means to be connected to a pair of subscriber's drop terminals of a common office line of paired wires together with a plurality of telephone sets of a direct connection telephone system. The polarity identifying means has positive and negative polarity output terminals. The polarity identifying means identifies voltage polarities on the subscriber's drop terminals and couples one of the drop terminals of a positive polarity with the positive polarity output terminal while coupling the other drop terminal of a negative polarity with the negative polarity output terminal.

A holding path is connected across the positive and negative polarity output terminals of the polarity identifying means and comprises resistor means and switching means. The holding path serves for holding the office line through the polarity identifying means at a time when the switching means is in an on-condition.

Turn-on signal generating means is connected across the positive and negative polarity terminals of the polarity identifying means through a manual switch means. The turn-on signal generating means generates a turn-on signal in response to operation of the manual switch means. The turn-on signal is applied to the switching means so that the switching means turns on to establish the office line holding condition.

The office line holding circuit further comprises turn-off signal generating means for generating a turn-off signal for the switching means in response to an electric voltage variation across the subscriber's drop terminals due to an off-hook operation at any one of the telephone sets.

According to an aspect of the present invention, the polarity identifying means is composed of a full wave rectifier circuit.

According to another aspect, the switching means is a unidirectional three-terminal thyristor. The resistor means comprises a first resistor connected to an anode terminal of the thyristor and a second resistor connected to a cathode terminal of the thyristor. The turn-on signal generating means is a circuit for generating a trigger pulse. The trigger pulse is applied to a gate terminal of the thyristor. The turn-off signal generating means comprises a capacitor connected in parallel with one of said first and second resistor.

According to still another aspect of the present invention, the office line holding circuit with an automatic release function further comprises hold indicator circuit means. The hold indicator circuit means comprises a switching transistor and an indicator lamp means connected in series with one another across the positive and negative polarity output terminals. A base of the switching transistor is connected to the holding path so that the switching transistor is turned on at a time when the switching means is turned on.

According to yet another aspect, the office line holding circuit with an automatic release function further comprises switch means for blocking a connection of the hold indicator circuit means across the positive and negative polarity terminals at a time when the switching means is in an off-condition, and driving means for driving the switch means to establish the connection of the hold indicator circuit means across the positive and negative polarity output terminals at a time when the switching means is in an on-condition.

According to a further aspect of the present invention, the office line holding circuit with an automatic release function further comprises a hold sound source connected across the positive and negative polarily output terminals. The hold sound source sends out a hold sound signal to the office line through the polarity identifying means when the switching means is turned on to establish the office line hold condition.

According to another aspect of the present invention, the office line holding circuit with an automatic release function further comprises a low pass filter. The low pass filter is inserted between the holding path and one of the positive and negative polarity output terminals for intercepting any alternating current component from flowing through the holding path.

According to a further aspect of the present invention, the office line holding circuit with an automatic release function further comprises a bypass circuit. The bypass circuit is connected in parallel with the holding path for bypassing any alternating current from the holding path.

Further objects, features and other aspect of the present invention will be understood from the following detailed description of preferred embodiments of the present invention with reference to the accompanying drawings.

DETAILED DESCRIPTION OF PREFERRED EMBODIMENTS

Figure 1:
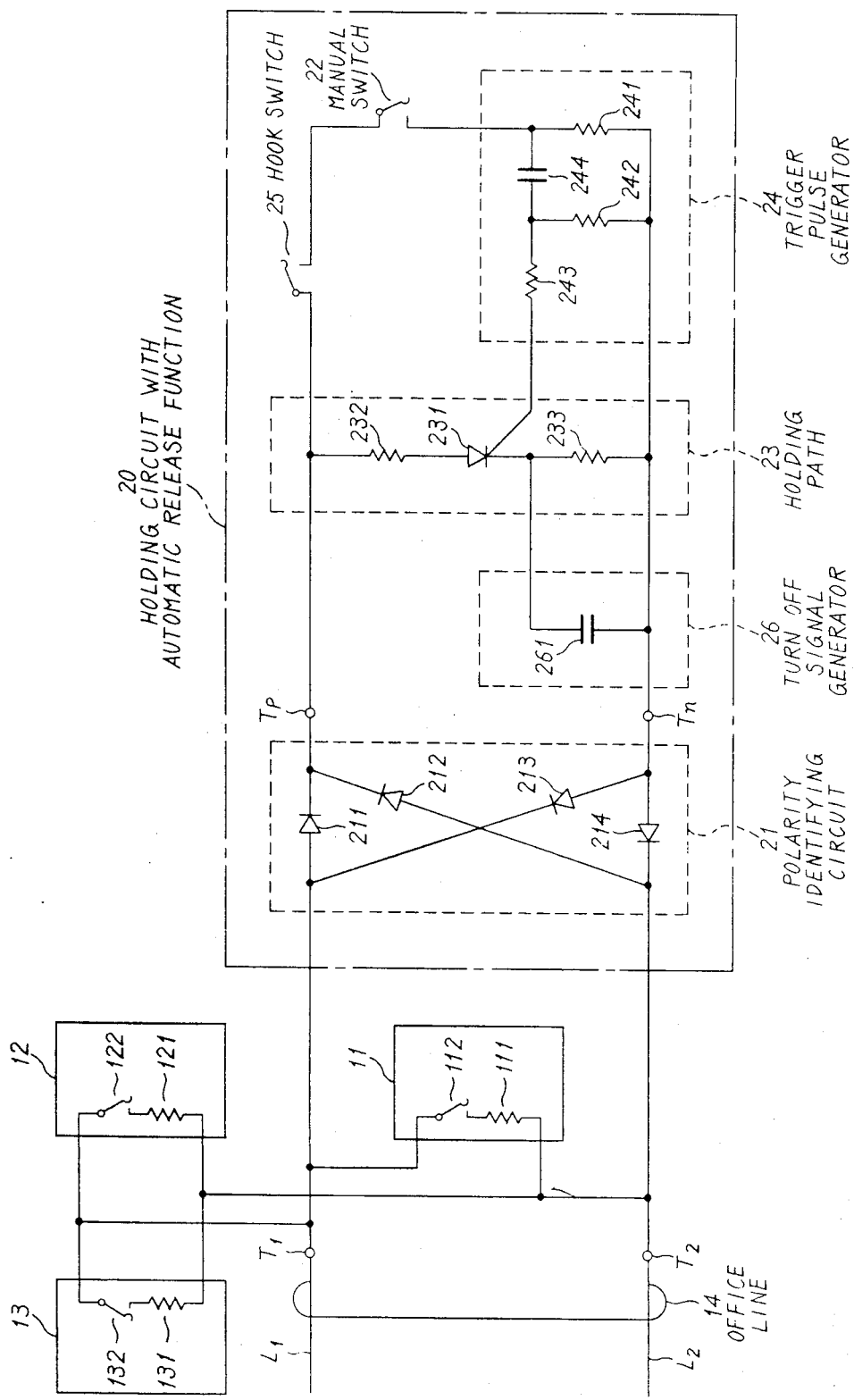
FIG. 1 is a schematic view illustrating a circuit diagram of a first embodiment of the present invention.

Referring to FIG. 1, a plurality of, for example, three telephone sets 11, 12 and 13 are directly connected to a pair of subscriber's drop terminals $T_1$ and $T_2$ of common office line 14 of paired two wires $L_1$ and $L_2$, in a direct connection telephone system.

The telephone sets 11, 12 and 13 have speech path resistors 111, 121 and 131 which are connected with the common office line 14 through hook switches 112, 122 and 132, respectively. The common office line 14 is connected with a direct voltage source (not shown) with a predetermined voltage, for example, 48 volts in an office through a line resistor (not shown).

An office line holding circuit with an automatic release function 20 is connected with the common office line 14 at the subscriber's drop terminals $T_1$ and $T_2$ together with the telephone sets, and is placed on one of the telephone sets, for example, the telephone set 11.

A polarity identifying circuit 21 is connected to the office line 14 and has positive and a negative polarity output terminals $T_p$ and $T_n$. The polarity identifying circuit 21 identifies voltage polarities of the paired wires $L_1$ and $L_2$ and connects one of the wires of a positive polarity to the positive polarity output terminal $T_p$ with the other wire of a negative polarity being connected to the negative polarity output terminal $T_n$.

In the embodiment shown, a full wave rectifier circuit is used as the polarity identifying circuit 2. As well known in the prior art, the full wave rectifier circuit is composed of four diodes 211, 212, 213 and 214.

A manual switch 22 is operated when the office line 14 is desired to be held.

A holding path 23 is connected across the positive and the negative polarity output terminals $T_p$ and $T_n$. The holding path 23 includes a unidirectional three-terminal thyristor 231, a resistor 232 connected to an anode terminal of the thyristor 231, and a resistor 233 connected to a cathode terminal of the thyristor 231. The holding path 23 holds the office line 14 through the polarity identifying circuit 21 when the thyristor 231 is in on-condition.

A turn-on signal generator 24 is connected across the positive and negative polarity output terminals $T_p$ and $T_n$ through the manual switch 22 and a hook switch 25. The turn-on signal generator 24 generates a turn-on signal in response to operation of the manual switch 22. In the embodiment shown, a trigger pulse generator is used as the turn-on signal generator 24. The trigger pulse generator 24 generates a trigger pulse as the turn-on signal. The trigger pulse is applied to a gate terminal of the thyristor 231.

The trigger pulse generator 24 comprises resistors 241, 242 and 243, and a capacitor 244. A first terminal of resistor 241 is connected to the positive polarity output terminal $T_p$ through hook switch 25 and manual switch 22 while a second terminal thereof is connected to negative polarity output terminal $T_n$. A first terminal of capacitor 244 is connected to first terminal of resistor 241. A second terminal of capacitor 244 is connected to gate terminal of thyristor 231 through resistor 243 and is connected to negative polarity output terminal $T_n$ through resistor 242.

When manual switch 22 is operated to produce an on-condition state during on-condition of hook switch 25, the voltage across the positive and the negative polarity output terminal $T_p$ and $T_n$ is supplied to the resistor 241 through hook switch 25 and manual switch 22, so that a differential waveform current is generated by capacitor 244 and resistor 242, and is applied to the gate terminal of thyristor 231 through resistor 243. Thus, thyristor 231 is turned on.

A turn-off signal generator 26 is provided to detect an electric voltage variation across the subscriber's drop terminals $T_1$ and $T_2$ in response to an off-hook operation at any one of the telephone sets 11, 12 and 13. The turn-off signal generator 26 generates a turn-off signal for the thyristor 231 so that the office line holding condition is released. In the embodiment shown, the turn-off signal generator 26 comprises a capacitor 261 connected in parallel with resistor 233. The capacitor 261 may be alternatively connected in parallel with the resistor 232.

In operation, when a handset (not shown) of telephone set 11 is lifted to produce an operated off-hook condition in response to an incoming call to the telephone system, the hook switches 112 and 25 close and the speech path resistor 111 is connected with the common office line 14. Providing that the direct voltage source in the office has a voltage $V_p$, the office line having a resistance $R_l$, the speech path resistor 111 having a resistance $R_{s1}$, and forward voltage drop of diodes 211 to 214 of the polarity identifying circuit 21 being negligible, a voltage $V_{1\text{-}2}$ across the subscriber's drop terminals $T_1$ and $T_2$ and voltage $V_{p\text{-}n}$ across the positive and negative polarity output terminals $T_p$ and $T_n$ are as follows:

$$V_{1\text{-}2} \approx V_{p\text{-}n} \approx \frac{R_{s1}}{R_l + R_{s1}} \cdot V_p. \quad (1)$$

When the manual switch 22 is operated to make an on-condition, state the voltage $V_{p\text{-}n}$ is supplied to the trigger pulse generator 24 through hook switch 25 and manual switch 22. Therefore, the trigger pulse generator 24 generates a trigger pulse to the gate terminal of thyristor 231. Thereby, thyristor 231 is turned on, so that the common office line 14 is held by the holding path 23 through polarity identifying circuit 21, even if the handset of telephone set 11 is reset to the on-hook condition wherein the hook switch 112 and 25 open and the speech path resistor 111 is separated from the common office line 14. In this condition, the voltage $V_{1\text{-}2}$ across the subscriber's drop terminals $T_1$ and $T_2$, the voltage $V_{p\text{-}n}$ across the positive and negative polarity output terminals $T_p$ and $T_n$, voltage $V_a$ across the anode terminal of thyristor 231 and the negative output terminal $T_n$, and a voltage $V_c$ across the capacitor 261 are as follows:

$$V_{1\text{-}2} \approx V_{p\text{-}n} \approx \frac{R_1 + R_2}{R_l + R_1 + R_2} \cdot V_p \quad (2)$$

$$V_a \approx V_c \approx \frac{R_2}{R_l + R_1 + R_2} \cdot V_p \quad (3)$$

where $R_1$ and $R_2$ are resistances of resistors 232 and 233, respectively, while a forward voltage drop of thyristor 231 is neglected.

In the condition, when a handset (not shown) of the telephone set 12 is lifted to make an off-hook condition, hook switch 122 closes and speech path resistor 121 is connected with the common office line 14. In this connection, the voltage $V_{1\text{-}2}$ across the subscriber's drop terminals $T_1$ and $T_2$, the voltage $V_{p\text{-}n}$ across the positive and negative polarity output terminals $T_p$ and $T_n$, the voltage $V_a$ across the anode terminal of thyristor 231 and the negative polarity output terminal $T_n$, and the voltage $V_c$ across the capacitor 261 are given by as follows:

$$V_{1\text{-}2} \approx V_{P\text{-}n} \approx \frac{\frac{R_{s2} \cdot (R_1 + R_2)}{R_{s2} + (R_1 + R_2)}}{R_l + \frac{R_{s2} \cdot (R_1 + R_2)}{R_{s2} + (R_1 + R_2)}} \cdot V_p \quad (4)$$

$$V_a \approx \frac{\frac{R_{s2} \cdot R_2}{R_{s2} + (R_1 + R_2)}}{R_l + \frac{R_{s2} \cdot (R_1 + R_2)}{R_{s2} + (R_1 + R_2)}} \cdot V_p \quad (5)$$

$$V_c \approx \frac{R_2}{R_l + R_1 + R_2} \cdot V_p, \quad (6)$$

where $R_{s2}$ is a resistance of the speech path resistor 121.

Therefore, the voltage $V_c$ across capacitor 261 is greater than the voltage $V_a$ across the anode terminal of thyristor 231 and the negative polarity output terminal $T_n$ ($V_c > V_a$). Accordingly, the current which flows through thyristor 231 is smaller than the conductive holding current of thyristor 231, and thyristor 231 is changed to an off-condition, so that the office line holding condition is released.

Figure 2:
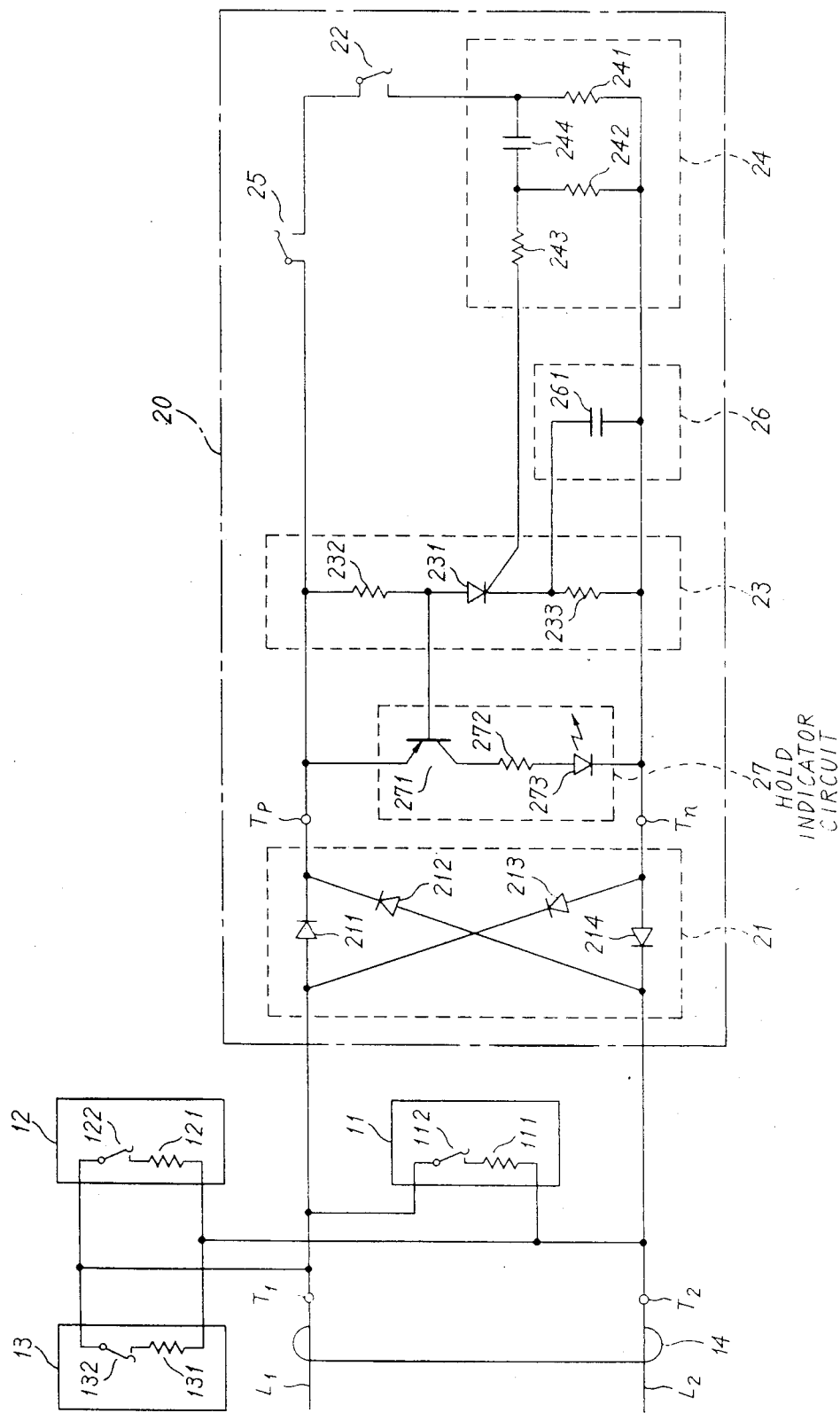
FIG. 2 is a schematic view illustrating a circuit diagram of a second embodiment of the present invention.

Referring to FIG. 2, another embodiment shown therein is similar to the embodiment of FIG. 1 except for hold indicator circuit 27. The similar parts are represented by the same reference numerals as in FIG. 1 and description thereto is omitted for the purpose of simplification of the description. The hold indicator circuit 27 comprises a switching transistor 271, a resistor 272 and an indicator lamp such as a light emission diode 273 which are connected in series with one another across the positive and negative polarity output terminals $T_p$ and $T_n$. A base terminal of switching transistor 271 is connected to the anode terminal of thyristor 231 so that switching transistor 271 is turned on when thyristor 231 is turned on.

In this circuit arrangement, when switching transistor 271 is in on-condition, switching transistor 271 is turned on to permit light emission diode 273 to emit light. Therefore, it is possible to indicate the office line holding condition.

Figure 3:
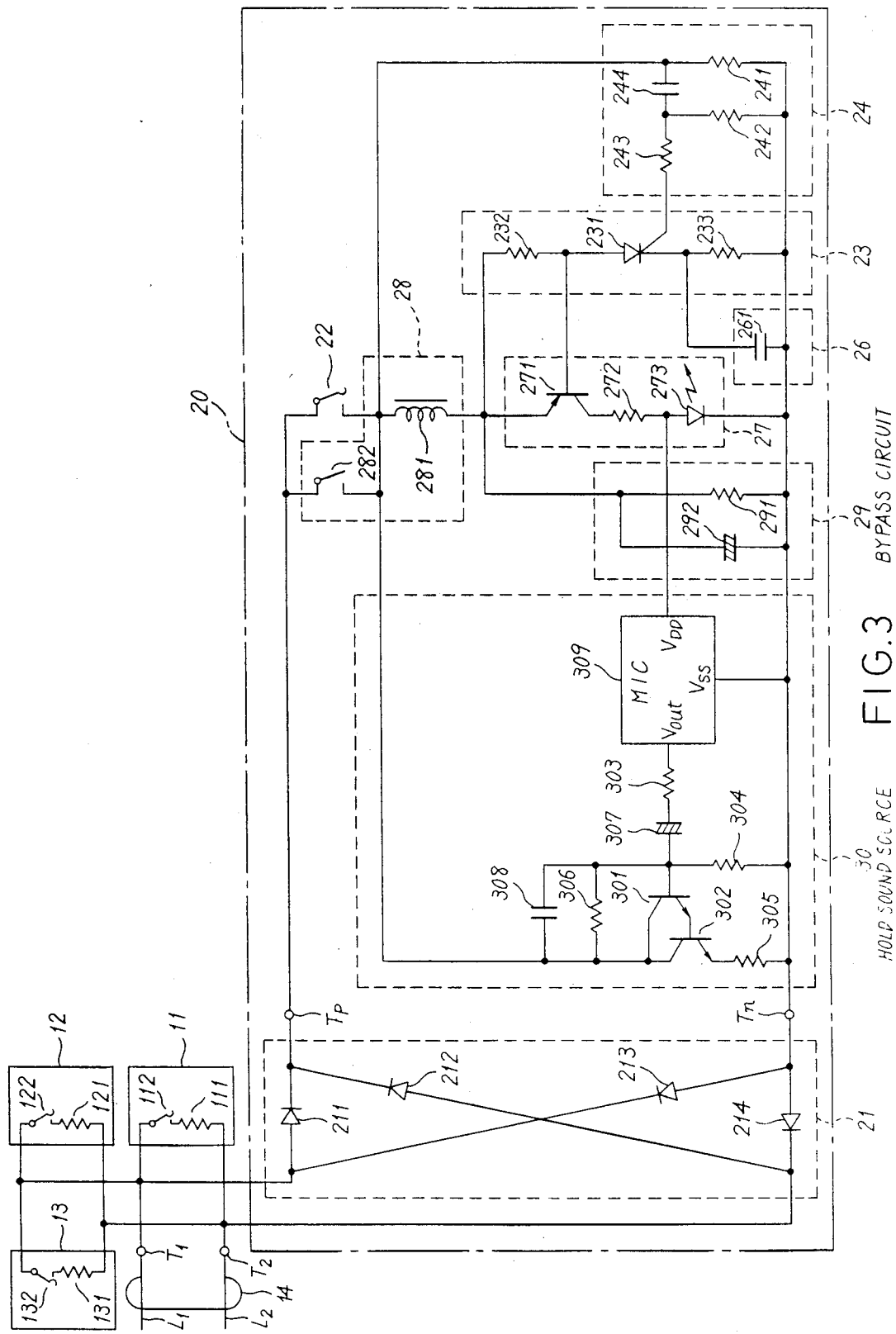
FIG. 3 is a schematic view illustrating a circuit diagram of a third embodiment of the present invention.

Referring to FIG. 3, still another embodiment shown therein is also similar to the embodiment of FIG. 2. The similar parts are designated by the same reference numerals as in FIG. 2, and the description thereto is omitted. The embodiment shown in FIG. 3 is characterized by a self-maintaining relay 28. The self-maintaining relay 28 has a coil 281 and a switch contact 282 connected in series with one another.

The holding path 23 and the hold indicator circuit 27 are connected to the positive and the negative output terminals $T_p$ and $T_n$ through the self-maintaining relay 28. The manual switch 22 is connected in parallel with the switch contact 282.

In this arrangement, the hold indicator circuit 27 is blocked from connection across the positive and the negative output terminals $T_p$ and $T_n$ before manual switch 21 is operated to turn on thyristor 231. Accordingly, any ringing signal is not applied to switching transistor 271 in the hold indicator circuit 27 through the polarity identifying circuit 21. Therefore, an economical and low withstand voltage transistor can be used for the switching transistor 271.

Furthermore, the inductance of the coil 281 of self-maintaining relay 28 is connected in series with the holding path 23. Since the coil inductance prevents any A.C. current component on the office line 14 from applying to thyristor 231 in the holding path, the thyristor 231 is prevented from erroneously turning off in response to the A.C. current.

The embodiment of FIG. 3 further comprises a bypass circuit 29. The bypass circuit 29 is connected in parallel with the holding path 23. The bypass circuit 29 is for bypassing any A.C. current on the office line 14. In the embodiment shown, the bypass circuit 29 comprises a resistor 291 and a capacitor 292 in parallel with one another. A resistance $R_3$ of resistor 291 and a capacitance $C_2$ of the capacitor 292 are selected so that a product $T_2$ of the resistance $R_3$ and the capacitance $C_2$, namely, a time constant $T_2 = R_3 \cdot C_2$ becomes smaller than a product $T_1$ of resistance $R_2$ and the capacitance $C_1$, namely, a time constant $T_1 = R_2 \cdot C_1$.

Any A.C. current on the office line 14 is reliably prevented from applying to the holding path 23 by the bypass circuit 29 in addition to the coil 281.

The embodiment of FIG. 3 further comprises a hold sound source 30 which is connected across the positive and negative polarity output terminals $T_p$ and $T_n$ through the switch contact 282. The hold sound source 30 sends out a hold sound signal to the office line 14 through the polarity identifying circuit 21 at a time when the thyristor 231 is turned on to establish the office line hold condition. In the embodiment shown, the holding sound source 30 comprises transistors 301 and 302, resistors 303, ..., 306, capacitors 307 and 308, and a hold sound generating circuit 309 which is well known in the prior art.

The hold sound generating circuit 309 is connected to an anode terminal of hold indicator lamp or L.E.D. 273 in the hold indicator circuit 27 and is driven when the L.E.D. 273 is operating. The hold sound signal from hold sound generating circuit 309 is amplified by transistors 301 and 302, and thereafter sent out to the office line 14 through the polarity identifying circuit 21.

Figure 4:
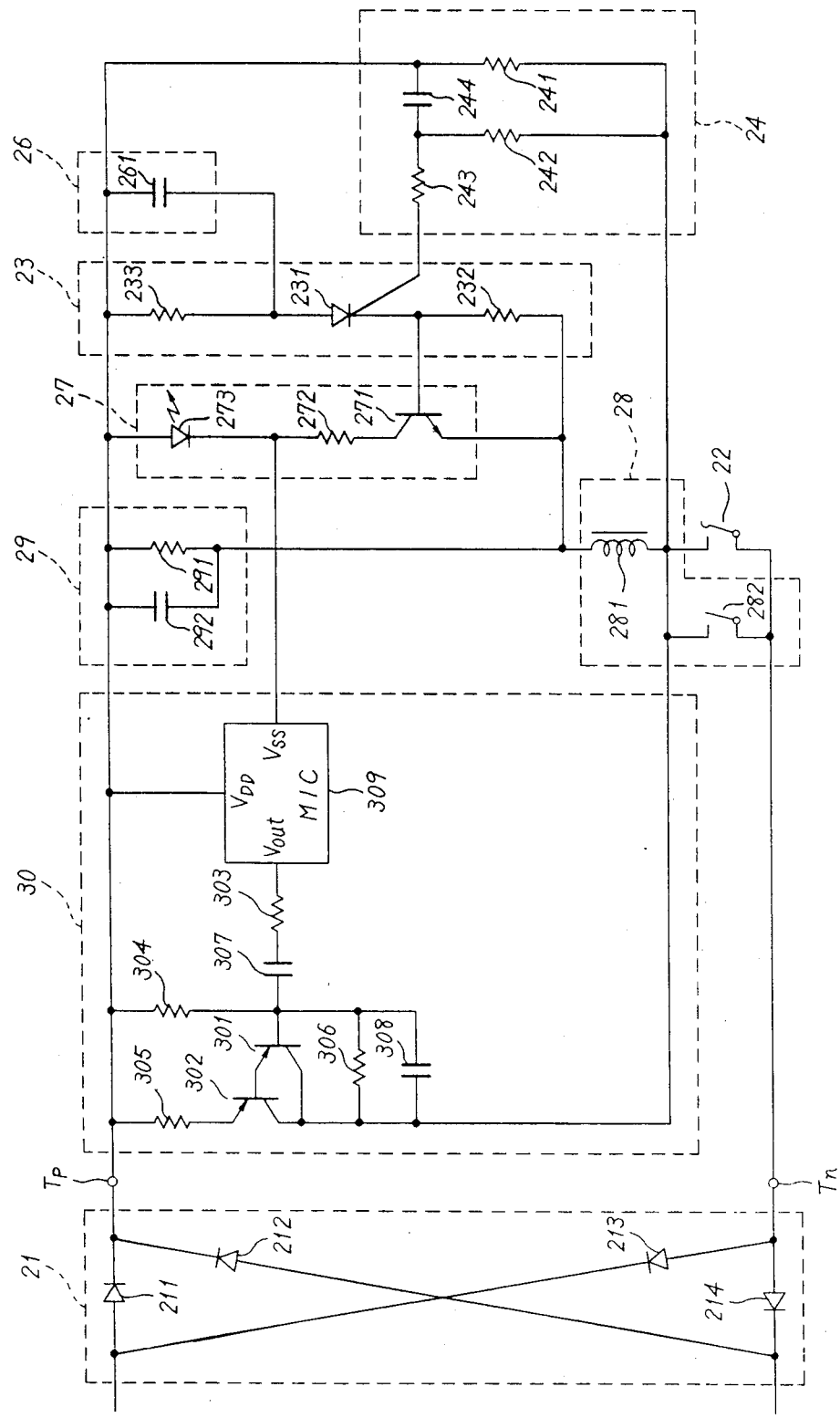
FIG. 4 is a schematic view illustrating a circuit diagram of a fourth embodiment of the present invention.

A further embodiment as shown in FIG. 4 is substantially similar to the embodiment of FIG. 3 except that NPN-type transistors 271, 301 and 302 are used in place of PNP-type ones.

Therefore, detailed description of the circuit arrangement and operation for this embodiment is omitted because its operation is analogous to the above embodiment illustrated in FIG. 3.

The office line holding circuit with an automatic release function of the present invention may be provided for a main telephone set of the direct connection system and for each of all of the telephone sets.

What is claimed is:

1. An office line holding circuit with an automatic release function for a direct connection telephone system having a plurality of telephone sets directly connected to a pair of subscriber's drop terminals of a common office line of paired two wires, which comprises:

polarity identifying means to be connected to said subscriber's drop terminals and having positive and negative polarity output terminals, said polarity identifying means identifying voltage polarities on said subscriber's drop terminals and coupling one of said drop terminals of a positive polarity with said positive polarity output terminal with the other drop terminals of a negative polarity being coupled with said negative polarity output terminal;

manual switch means to be operated when the office line is desired to be held;

a holding path including resistor means and switching means connected across said positive and negative polarity output terminals, said holding path holding said office line through said polarity identifying means when said switching means is in an on-condition;

turn-on signal generating means connected across said positive and negative polarity output terminals through said manual switch means and generating a turn-on signal in response to operation of said manual switch means, said turn-on signal being applied to said switching means for turning on said switching means so that an office line holding condition is established;

turn-off signal generating means for generating turn-off signal for said switching means in response to an electric voltage variation across said subscriber's drop terminals due to an off-hook operation at any one of said telephone sets so that the office line holding condition is released;

hold indicator circuit means comprising a switching transistor and an indicator lamp means connected in series with one another across said positive and negative polarity output terminals, said switching transistor having a base connected to said holding path so that said switching transistor is turned on when said switching means is turned on;

switch means for blocking connection of said hold indicator circuit means across said positive and negative polarity output terminals when said switching means is in off-condition; and driving means for driving said switch means to establish the connection of said hold indicator circuit means across said positive and negative polarity output terminals when said switching means is in an on-condition, said switch means and said driving means being a self-maintaining relay including a switch contact and a driving coil connected in series with one another, said holding path being connected across said positive and negative polarity output terminal means through said switch contact and said driving coil, said manual switch means being connected in parallel with said switch contact.

2. The office line holding circuit with an automatic release function as claimed in claim 1, wherein at least one of said telephone sets has a hook switch through which said manual switch means and said turn-on signal generating means are connected to said positive and negative polarity output terminals.

3. The office line holding circuit with an automatic release function as claimed in claim 1, wherein said switching means is a unidirectional three-terminal thyristor, said turn-on signal generating means being a circuit for generating a trigger pulse, said trigger pulse being applied to a gate terminal of said thyristor.

4. The office line holding circuit with an automatic release function as claimed in claim 3, wherein said resistor means comprises a first resistor connected to an anode terminal of said thyristor and a second resistor connected to a cathode terminal of said thyristor, said turn-off signal generating means comprising a capacitor connected in parallel with one of said first and second resistors.

5. The office line holding circuit with an automatic release function as claimed in claim 1, wherein said polarity identifying means comprises a full wave rectifier circuit.

6. The office line holding circuit with an automatic release function as claimed in claim 1, wherein said hold indicator circuit means is connected in parallel with said holding path.

7. The office line holding circuit with an automatic release function as claimed in claim 1, which further comprises a hold sound source connected across said positive and negative polarity output terminals, said hold sound source sending out a hold sound signal to said office line through said polarity identifying means when said switching means is turned on to establish the office line hold condition.

8. The office line holding circuit with an automatic release function as claimed in claim 1, which further comprises a low pass filter between said holding path and one of said positive and negative polarity output terminals for intercepting any alternating current from flowing through said holding path.

9. The office line holding circuit with an automatic release function as claimed in claim 8, wherein said low pass filter is an inductor.

10. The office line holding circuit with an automatic release function as claimed in claim 1, which further comprises a bypass circuit connected in parallel with said holding path for bypassing any alternating current component to thereby prevent the alternating current component from flowing through said holding path.

11. The office line holding circuit with an automatic release function as claimed in claim 10, wherein said bypass circuit comprises a resistor and a capacitor connected in parallel with one another.

* * * * *